Oct. 22, 1957  R. M. CRACCHIOLO  2,810,585
BAR STOCK PUSHER
Filed May 25, 1956

INVENTOR.
RAY M. CRACCHIOLO
BY
ATTORNEYS

2,810,585

BAR STOCK PUSHER

Ray M. Cracchiolo, Grosse Pointe, Mich., assignor to Burns Automatic Corporation, Roseville, Mich., a corporation of Michigan Application May 25, 1956, Serial No. 587,425

7 Claims. (Cl. 279—43)

This invention relates to a bar stock pusher.

It is an object of this invention to provide a bar stock pusher which is positive in its action; that is, a pusher designed to effectively grip the bar stock and feed it the required distance in an accurate and precise manner and within a minimum time cycle.

A further object of the invention resides in the provision of a bar stock pusher that is designed to effectively grip the bar stock to advance it in the feed direction and nevertheless readily slide over the bar stock without scoring it in the retracting direction.

A further object of the invention resides in the provision of a bar stock pusher which is economical in construction, very durable and which is so designed that substantially all of the wear is encountered by a single replaceable member on the pusher.

Figure 1:
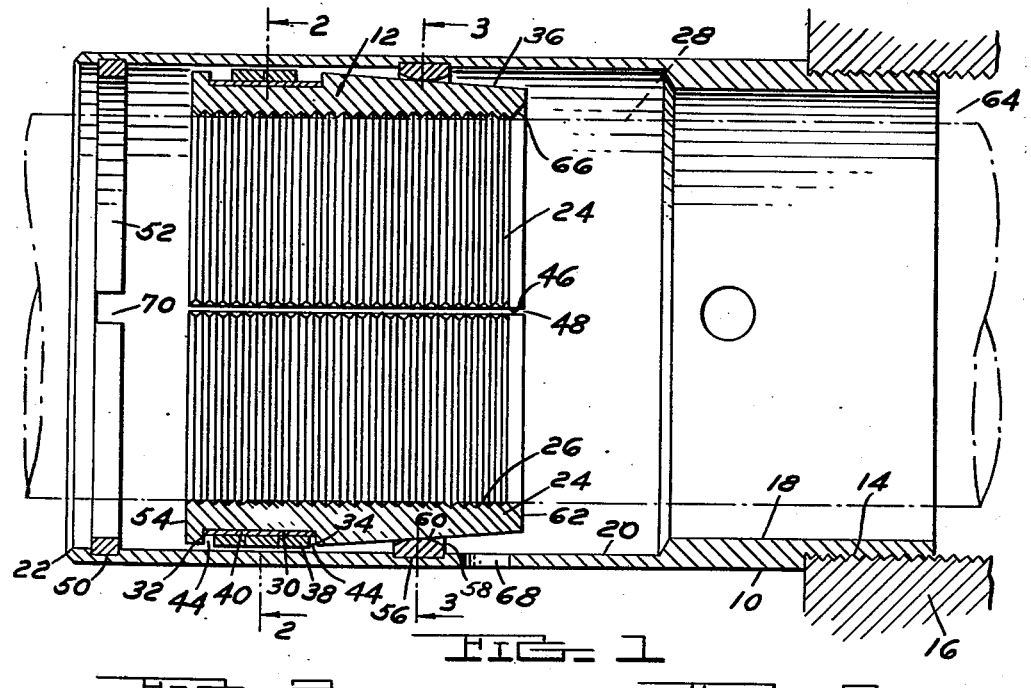
Fig. 1 is a longitudinal sectional view of a bar stock pusher constructed in accordance with the present invention and showing the parts in the position gripping a piece of bar stock.

Referring more particularly to the drawings, the bar stock pusher of the present invention, as will be seen from Fig. 1, generally comprises two main components, a shell 10 and a pad assembly 12. The pusher shell 10 is externally threaded at one end as at 14 for engagement with the conventional power-driven pusher actuator 16 on the machine tool on which the pusher is mounted. Pusher actuator 16 is automatically shifted through a feed stroke and then retracted at the end of each machining cycle to advance the required length of bar stock from which the work piece is formed. Shell 10 is fashioned with a through bore 18 having an enlarged cylindrical portion 20 extending to the end 22 of the pusher shell.

Pad assembly 12 comprises four arcuate pads 24, each of which is of identical configuration. Each pad 24 generally forms a 90° segment of a circle. The inner surfaces of these pads are generally cylindrical and preferably provided with serrations 26 for effectively gripping a length of cylindrical bar stock designated 28. The outer surface of pad assembly 12 is fashioned with an annular groove 30 of substantially rectangular cross section. Groove 30 is formed around pad assembly 12 adjacent the end 22 thereof. At each side, groove 30 is defined by shoulders 32 and 34 which lie in planes perpendicular to the axis of the pad assembly. Between shoulder 34 and the end of pad assembly 12 opposite the groove 30, the outer surface of the pad assembly is conically shaped as indicated at 36.

Pads 30 are held in assembled relation by a coil spring 38 and a flat retainer spring 40 seated in groove 30.

Figures 2, 3:
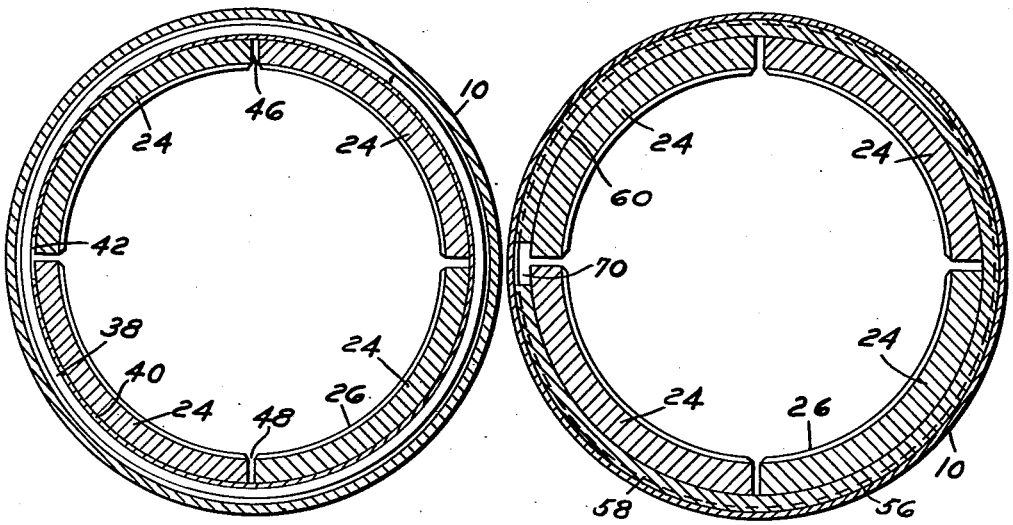
Fig. 2 is a sectional view taken along the lines 2—2 in Fig. 1.
Fig. 3 is a sectional view taken along the lines 3—3 in Fig. 1.
Figure 4:
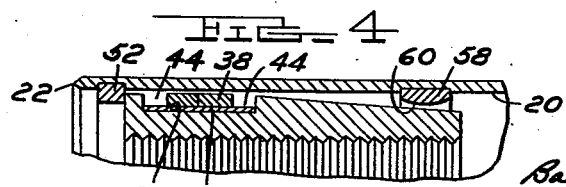
Fig. 4 is a fragmentary sectional view similar to Fig. 1 and showing the parts in the non-gripping position.

Retainer spring 40 is fashioned of relatively light flat spring stock and is preferably of single thickness; that is, it extends around the pad assembly 12 as a single convolution. Spring 40 is dimensioned in circumference so that there will be a slight gap 42 (Fig. 2) between the opposite ends thereof. The width of spring 40 corresponds substantially exactly to the width of groove 30 between shoulders 32 and 34 so that spring 40 has an accurate close fit in groove 30. Spring 40 normally tends to contract slightly around pads 24. However, the means for actually retaining the pads in their circumferentially assembled relation is not flat spring 40, but coil spring 38. Coil spring 38 is of relatively heavy construction, and the axial length thereof in relation to the width of groove 30 is not critical. As a matter of fact, there is a clearance space 44 between each end of spring 38 and the shoulders 32 and 34 of groove 30. Thus, the opposite ends of the wire forming spring 38 can be cut off square and need not be ground flat. Coil spring 38 is designed to contract itself around the flat spring 40 and tends to hold the pads 24 so that their axially extending edges 46 are in abutting relation. In Figs. 1, 2 and 3, the pads 24 are shown having a slight clearance 48 between their adjacent longitudinal edges 46. The pads are illustrated in this manner since they are shown engaging the length of bar stock 28. The radius of bar stock 28 is generally equal to the radius of the crests of the serrations 26. However, pad assembly 12 is initially formed from a circumferentially continuous tube and then is divided into the four pads 24 by sawing or otherwise slitting the tube axially into the four pads as to provide the clearance space 48.

The cylindrical bore portion 20 of shell 10 is formed with an internal annular groove adjacent the end 22 thereof. Within the groove 40, there is seated a spring retainer ring 52. The diameter of the bore portion 20, it will be observed, is slightly greater than the outer diameter of pad assembly 12 at the end thereof adjacent shoulder 32; and the inner diameter of ring 52 when seated in groove 50 is slightly less than the outer diameter of pad assembly 12 adjacent shoulder 44. Thus, ring 52 provides an abutment for the end face 54 of pad assembly 12. The cylindrical bore portion 20 of shell 10 is provided with a second annular groove 56 in which is seated an annular pressure ring 58. Rings 52 and 58 are preferably formed of spring steel. Ring 58 has the inner annular surface thereof of arcuate formation in cross section as is best seen in Fig. 1. With the bar stock 28 within pad assembly 12, the dimension of the taper formed on the conical surface 36 of the pad assembly is such that the rounded annular surface 60 of ring 58 engages the conical surface 36 approximately midway between the end 62 and the shoulder 34 of pad assembly 12. The ends of rings 52 and 58 are spaced apart as at 70 and 72, respectively, so that they can be readily removed and replaced when necessary.

In operation, a length of bar stock 28 is arranged within the pusher by introducing it through the opening 64 in the actuator 16. The tapered mouth 66 at the end 62 of pad assembly 12 enables the bar stock to be guided readily into the pad assembly, thus expanding spring 38. When pusher actuator 16 is advanced in the feeding direction, that is, towards the left as shown in Fig. 1, pad assembly 12 remains stationary until the rounded inner surface 60 of pressure ring 58 engages the tapered surface 36 of pad assembly 12. In view of the shape of surface 60, substantially line pressure contact occurs between ring 58 and the conical surface 36 of pad assembly 12. A high unit pressure is thus produced, and the pads 24 are therefore instantaneously urged radially inwardly into firm gripping engagement with the outer surface of bar 28. Thus, substantially immediately upon contact of ring 58 with tapered surface 36, bar 28 is tightly gripped by the pad assembly and the bar 28, pad assembly 12 and the pusher shell 10 are shifted to the left as a single unit through the feed stroke of actuator 16. When pusher actuator 16 is retracted, that is, shifted to the right, the frictional engagement between the serrations 26 and the bar stock 28 resulting from the action of spring 38 results in an instantaneous release of the curved surface 60 of ring 58 from the tapered surface 36 of pad assembly 12. Thus, the pad assembly 12 remains fixed on bar 28 until the ring 52 abuts against the end face 54 of the pad assembly. At this point, the pad assembly 12 is picked up by ring 52 and slides over the bar 28 to a new position at the end of the retraction stroke of actuator 16. In this connection, it will be observed that when it is desired to remove the bar 28 from within the pusher, a suitable tool is introduced through the opening 68 in shell 10 when actuator 16 is in the retracted position; and when the bar 28 is pulled out in a direction towards the right in Fig. 1, pad assembly 12 will move to the right with bar 28 until the end 62 abuts against the tool inserted through opening 68 and thereafter, the pad assembly simply slides over the surface of bar 28.

Spring 38 is designed such that pads 24 snugly engage bar 28 when pressure ring 58 is out of engagement with the conical surface 36 but nevertheless slide readily over the bar 28 when ring 52 abuts the end face 54 of the pad assembly on the retraction stroke of actuator 16. Thus, spring 38 yieldably resists axial movement of the pad assembly 12 relative to the bar 28, but not with sufficient tension to produce scoring of the bar 28 as the pad assembly is retracted thereover.

I have discovered that the combination of the two springs 38 and 40 render the present arrangement much more efficient than those arrangements wherein either a single coil spring or a single flat annular spring is employed for holding the pads in assembled relation. Spring 40, by reason of its close fit within groove 30, maintains the pad 24 in perfect alignment axially of the assembly; that is, it prevents one or more of the pads 24 from shifting forwardly or rearwardly with respect to the other pads. It is important that these pads be held in perfect alignment in this manner because if the tapered surfaces 36 of all the segments 24 are not properly aligned so as to form a truly conical surface, one or more of the pads would be engaged by the pressure ring 58 before another of these pads is engaged by the pressure ring; and thus, the length of bar stock fed would vary.

The slight tension of spring 38 and the weight of the bar to be fed represents the total force that must be overcome to insert a bar in the pusher. Thus, since the tension of spring 38 is only sufficient to prevent sliding of the pad assembly on the bar when shell 10 is shifted in the feed direction, the pads 24 expand readily when a bar is introduced through the mouth 66 and the feeding force need be relatively small. Since this force necessary to feed the bar is a relatively weak force, the shell is not subjected to severe abuse in use and can therefore be of light construction as shown, especially at the threaded portion 14.

Another advantage of the present invention resides in the provision of the removable pressure ring 58 and the rounded surface 60 thereof. As pointed out previously, the rounded surface 60 insures substantially line contact with the conical surface 36 of the pad assembly to reduce friction to a minimum and produce a high unit pressure. Pads 24 and pressure ring 58 are both hardened by heat treatment. Ring 58 is preferably treated so that its hardness is just slightly less than the hardness of the conical surface 36 of pad assembly 12. Thus, if any wear occurs over a period of extended use, it will occur at the rounded surface 60 of ring 58 rather than at the tapered surface 36 of the pad assembly. It will be appreciated that when the surface 60 wears substantially, ring 58 may be readily removed and replaced with a new one.

In the pusher arrangement described, the assembly and disassembly are rather simple operations. After the individual pads are arranged into the assembly 12, the whole assembly can be inserted into the shell 10 through the end 22 and the ring 52 thereafter snapped into place in groove 50. When it is desired to remove pad assembly 12 from within shell 10 such as when it becomes necessary to replace pressure ring 58, all that is necessary is to remove ring 52 by lifting it out of its groove 50 and slipping the pad assembly 12 out of the end 22 of the shell.

I claim:

1. A bar stock pusher comprising an outer shell and a pad assembly shiftable axially within the shell, said pad assembly comprising a plurality of circumferentially arranged pads adapted to grip a bar of stock inserted therein, said shell having a cylindrical bore portion adjacent one end thereof, said pad assembly being axially shiftable in said cylindrical bore portion and comprising a plurality of arcuate segments arranged in cylindrical fashion, said pad assembly having a circumferential groove around the outer surface thereof, spring means within said groove for normally contracting the pads inwardly against the bar stock extending therethrough, said pad assembly having the outer surface thereof generally conically shaped adjacent one end, said cylindrical bore portion having an annular groove therein, a resilient ring removably seated in said groove, said ring having a circumferential extent slightly less than that of the groove whereby it may be circumferentially contracted and thereby readily extracted from the groove, said ring being arranged to contact and circumferentially engage said conical surface when the shell is moved in one direction relative to said pad assembly and means for limiting the movement of said shell in the opposite direction relative to said pad assembly.

2. The combination set forth in claim 1 wherein said ring has an inner annular surface which is of arcuate configuration in axial section.

3. The combination set forth in claim 1 wherein said last mentioned means comprises an annular ring removably fixed in said shell and engageable with the opposite end of said pad assembly.

4. The combination set forth in claim 3 wherein said cylindrical bore portion extends to adjacent one end of said shell, said bore portion being provided at said end with an annular groove, said last mentioned ring being resilient and seated within said last mentioned groove.

5. A bar stock pusher comprising an outer shell and a pad assembly shiftable axially within the shell, said pad assembly comprising a plurality of circumferentially arranged pads adapted to grip a bar of stock inserted therein, said shell having a cylindrical bore portion adjacent one end thereof, said pad assembly being axially shiftable in said cylindrical bore portion and comprising a plurality of arcuate segments arranged in cylindrical fashion, said pad assembly having a circumferential groove around the outer surface thereof, spring means within said groove for normally contracting the pads inwardly against the bar stock extending therethrough, said pad assembly having the outer surface thereof generally conically shaped adjacent one end, said cylindrical bore portion having an annular groove therein, a resilient ring removably seated in said groove, said ring having a circumferential extent slightly less than that of the groove whereby it may be circumferentially contracted and thereby readily extracted from the groove, said ring being arranged to engage said conical surface in substantially line contact when the shell is moved in one direction relative to said pad assembly and means for limiting the movement of said shell in the opposite direction relative to said pad assembly.

6. A bar stock pusher comprising an outer shell and a pad assembly shiftable axially within the shell, said pad assembly comprising a plurality of circumferentially arranged pads adapted to grip a bar of stock inserted therein, said shell having a cylindrical bore portion adjacent one end thereof, said pad assembly being axially shiftable in said cylindrical bore portion and comprising a plurality of arcuate segments arranged in cylindrical fashion, said pad assembly having a circumferential groove around the outer surface thereof, spring means within said groove for normally contracting the pads inwardly against the bar stock extending therethrough, said pad assembly having the outer surface thereof generally conically shaped adjacent one end, said cylindrical bore portion having an annular groove therein, a resilient ring removably seated in said groove, said ring having a circumferential extent slightly less than that of the groove whereby it may be circumferentially contracted and thereby readily extracted from the groove, said ring being arranged to contact and circumferentially engage said conical surface when the shell is moved in one direction relative to said pad assembly and means for limiting the movement of said shell in the opposite direction relative to said pad assembly, said tapered surface of said pad assembly and said ring being hardened, the hardness of said ring being slightly less than the hardness of said conical surface.

7. A bar stock pusher comprising an outer shell and a pad assembly shiftable axially within the shell, said pad assembly comprising a plurality of circumferentially arranged pads adapted to grip a bar of stock inserted therein, said shell having a cylindrical bore portion adjacent one end thereof, said pad assembly being axially shiftable in said cylindrical bore portion and comprising a plurality of arcuate segments arranged in cylindrical fashion, said pad assembly having a circumferential groove around the outer surface thereof, spring means within said groove for normally contracting the pads inwardly against the bar stock extending therethrough, said pad assembly having the outer surface thereof generally conically shaped adjacent one end, said cylindrical bore portion having an annular groove therein, a resilient ring removably seated in said groove, said ring having a circumferential extent slightly less than that of the groove whereby it may be circumferentially contracted and thereby readily extracted from the groove, said ring being arranged to engage said conical surface in substantially line contact when the shell is moved in one direction relative to said pad assembly and means for limiting the movement of said shell in the opposite direction relative to said pad assembly, said inner annular surface of said ring and said conical surface of said pad assembly being hardened, the hardness of said inner annular surface of the ring being slightly less than the hardness of said conical surface.

References Cited in the file of this patent

UNITED STATES PATENTS

| | | |
|---|---|---|
| 2,218,402 | Martin | Oct. 15, 1940 |
| 2,362,494 | Martin | Nov. 14, 1944 |
| 2,363,889 | Martin | Nov. 28, 1944 |
| 2,363,890 | Martin | Nov. 28, 1944 |
| 2,513,557 | Gallen | July 4, 1950 |